Sept. 1, 1964  C. W. HEINLE  3,146,749
METHOD OF FORMING A NECK ON A CAN PART
Filed June 16, 1961  3 Sheets-Sheet 1

INVENTOR.
CARL WILLIAM HEINLE
BY Leland R. McCann
George W. Reiber
ATTORNEYS

Sept. 1, 1964 C. W. HEINLE 3,146,749
METHOD OF FORMING A NECK ON A CAN PART
Filed June 16, 1961 3 Sheets-Sheet 2
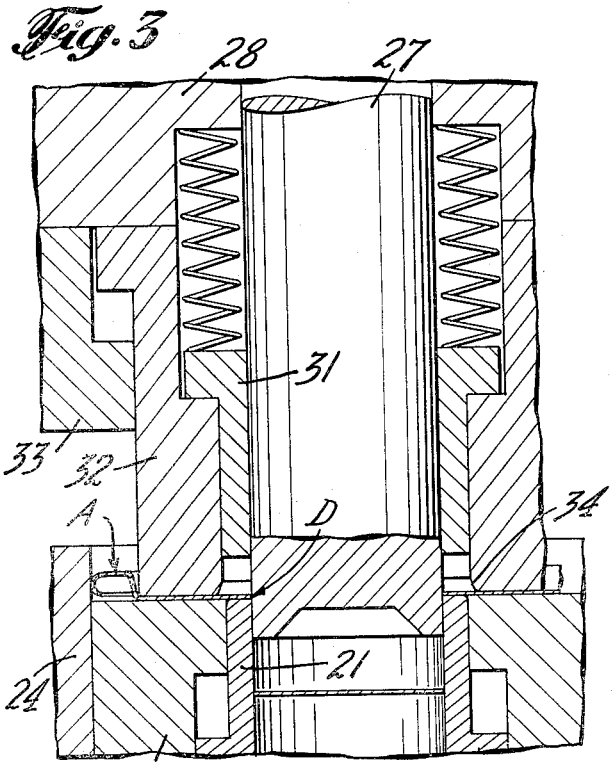
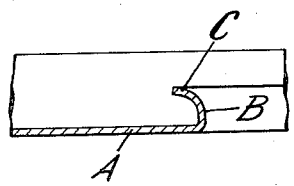
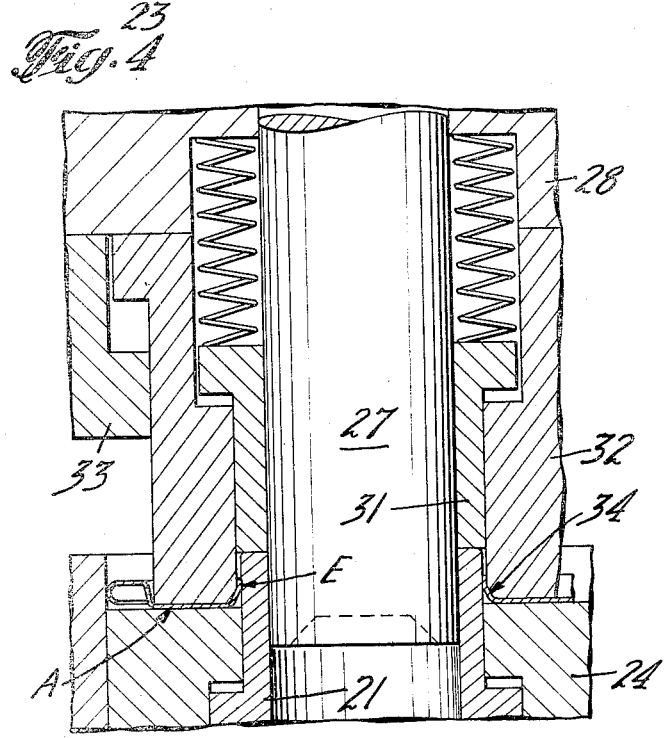
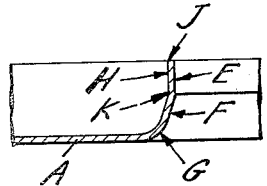
INVENTOR.
CARL WILLIAM HEINLE
BY Leland R. McCann
George W. Reiber
ATTORNEYS Sept. 1, 1964  C. W. HEINLE  3,146,749
METHOD OF FORMING A NECK ON A CAN PART
Filed June 16, 1961  3 Sheets-Sheet 3
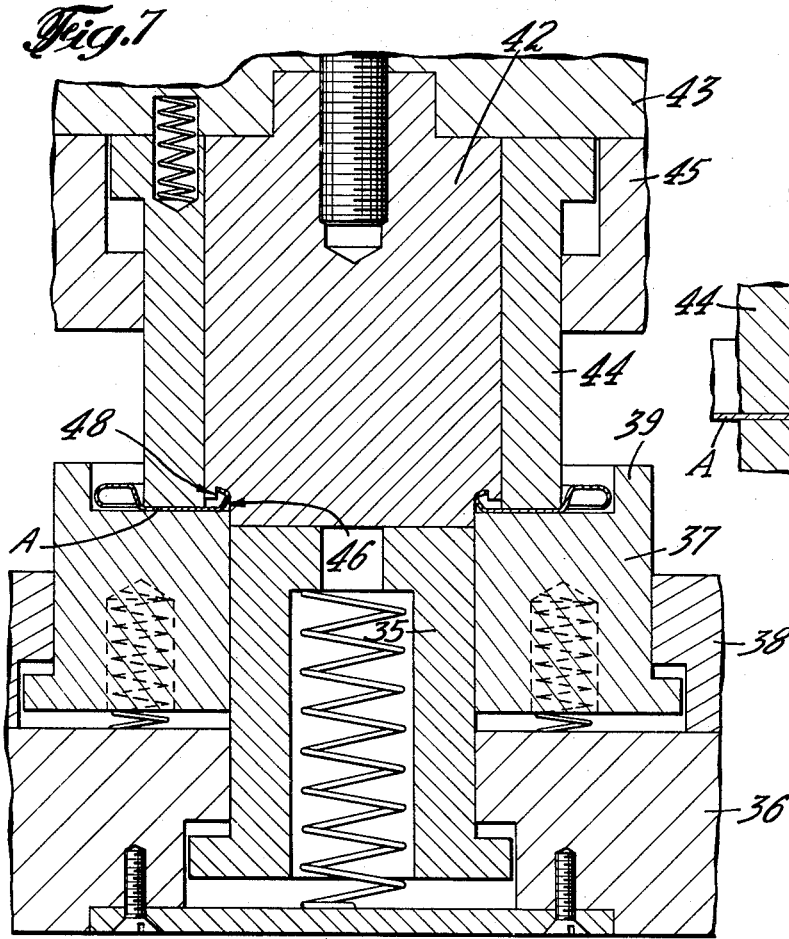
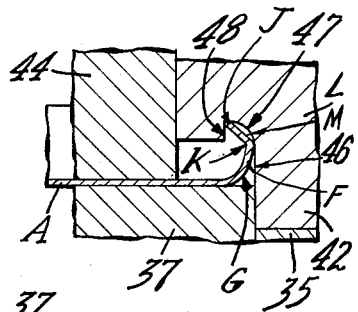
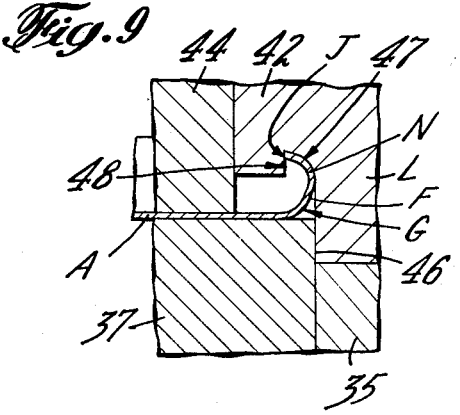
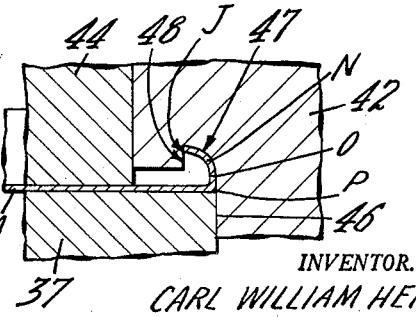
INVENTOR.
CARL WILLIAM HEINLE
BY Leland R. McCann
George W. Reiber
ATTORNEYS

United States Patent Office 3,146,749
Patented Sept. 1, 1964

3,146,749
METHOD OF FORMING A NECK ON A CAN PART
Carl William Heinle, Short Hills, N.J., assignor to American Can Company, New York, N.Y., a corporation of New Jersey
Filed June 16, 1961, Ser. No. 117,726
5 Claims. (Cl. 113—121)

The present invention relates to a method of forming a neck on a can part and has particular reference to shaping the neck portions to precise dimensions for cooperation with close fitting auxiliary members.

In the manufacture of sheet metal containers, the end closures are frequently provided with upstanding necks having flared top edges which usually serve as pouring devices which may be readily closed with snap or screw caps. Such container necks usually are die formed without much regard to precise measurements since a high degree of accuracy in dimensions is not essential to their operation.

Where the main function of such a container neck is to serve as a base or retainer for another member, such as plastic pouring nozzle or the like, the precise dimensions of the neck are highly essential so as to provide for close fitting of the parts to prevent leakage of liquids therebetween and to insure against inadvertent detachment.

In the instant invention the precise dimensioning of the neck is effected by a crowding of the material of the neck into close fitting engagement with support elements through an edgewise pressure on the neck wall, as distinguished over the usual die forming operation.

It is therefore an object of the instant invention to produce on a container part an upstanding annular neck of precise dimensions to exactly fit and to receive an auxiliary container part such as a pouring nozzle or the like device.

Another object is the provision of a method of producing such a precisely dimensioned neck in a manner which provides for full control over the reformation of the neck material so as to produce the required results.

Another object is to produce the reformation of the neck material through the application of an edgewise pressure on the neck material so as to effect a crowding of the material into a precise location.

Another object is to produce an accurately curved flared wall section on the neck with the terminal raw edge of the neck included as a corresponding coextension of the curved wall section.

Numerous other objects and advantages of the invention will be apparent as it is better understood from the following description, which, taken in connection with the accompanying drawings, discloses a preferred embodiment thereof.

Referring to the drawings:

FIGS. 3 and 4 are enlarged sectional views of certain of the apparatus parts shown in FIG. 1, with the parts shown in different positions, the views including a can part in its different stages of the preliminary neck formation;

FIG. 5 is an enlarged fragmentary sectional view of the can part shown in FIG. 2 with the view showing the preliminary formation of the neck;

FIG. 6 is a view similar to FIG. 5 and showing the formation of the finished neck;

Figure 1:
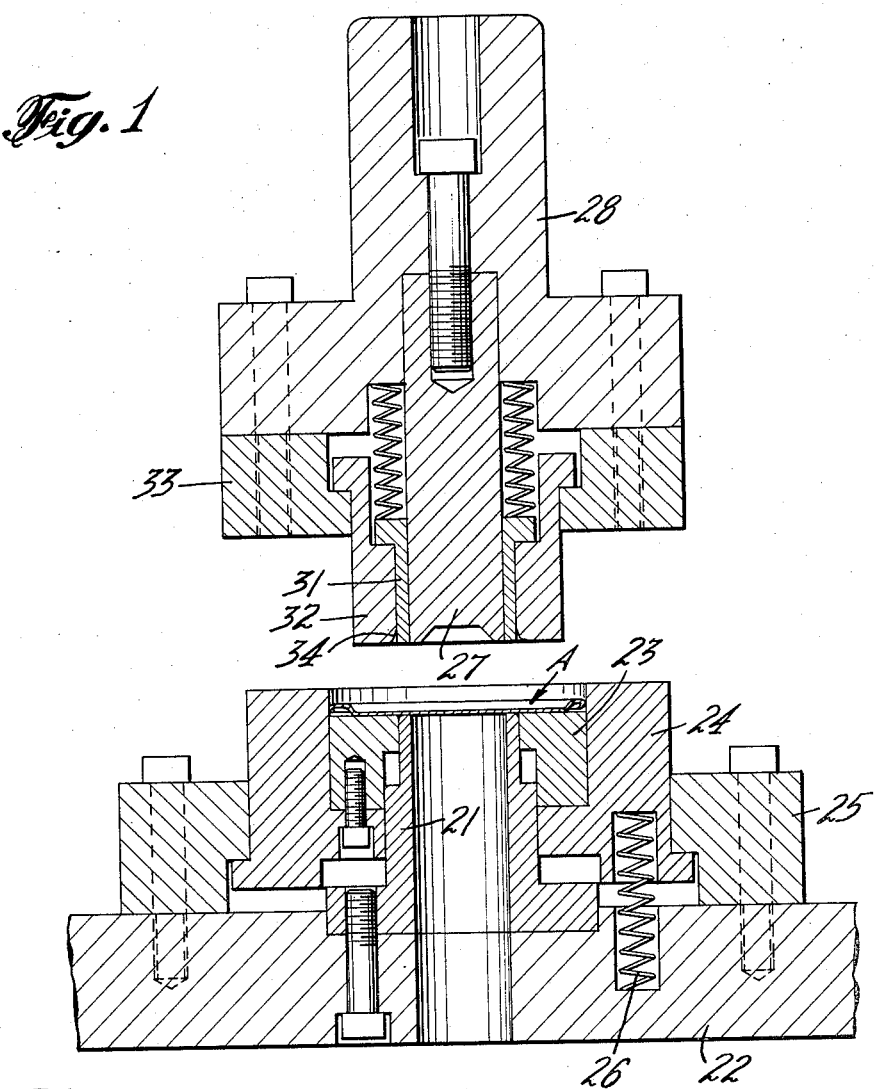
FIGURE 1 is a sectional view of an apparatus for carrying out the preliminary steps of forming a neck on a can part in accordance with the instant method invention.

FIG. 7 is a sectional view of an apparatus for carrying out the finished steps of forming the neck on a can part in accordance with the instant method invention; and FIGS. 8, 9 and 10 are enlarged fragmentary sectional views of certain of the apparatus parts shown in FIG. 7, with the parts in different positions, the views including a can part on its different stages of finishing the neck formation.

As a preferred and exemplary embodiment of the instant method invention, the drawings disclose the steps of producing on a sheet metal can end A (FIGS. 1 and 2) a precisely dimensioned upstanding neck B (FIG. 6) having a precisely dimensioned curved and outwardly flared lip or terminal edge portion C.

In accordance with the method steps of the instant invention, the can end A is first pierced to produce a circular aperture D (FIG. 3) of the desired diameter. The marginal edge portion of the can end surrounding the aperture D is then struck out of the plane of the can end to produce a preliminary upstanding annular neck portion E (FIGS. 4 and 5). This preliminary neck portion E comprises an inwardly extending sloping annular wall section F (FIG. 5) connected at its base to the can end A by a comparatively large curved annular wall section G and merging at its outer end into a substantially vertical annular wall section H terminating in a raw edge J.

The vertical annular wall section H is reduced in thickness by an amount preferably equal to substantially one-tenth of the thickness of the sloping wall section F. For example if the sloping wall section F is substantially ten thousandths of an inch thick, the vertical wall section H is reduced to substantially nine thousandths thick. This reduction in thickness of the vertical wall section H is effected by a dragging or elongating action on the wall section and this action produces a sharp distinct annular "break" line K at the junction of the vertical wall section H and the sloping wall section F.

A cylindrical support L (FIG. 8) having a precise outside diameter is introduced into the preliminary neck portion E and a vertical edgewise or endwise pressure is then applied to the vertical wall section H at the terminal raw edge J. Simultaneously with this action the vertical wall section H is guided to bend or flare it outwardly as shown in FIG. 8. This combined pressure and guiding action bends the vertical wall section H at the "break" line K and thus produces an outwardly sloping annular or conical wall section M (FIG. 8).

As the endwise pressure on the neck portion is continued, the outer terminal raw edge J is confined and the conical wall section M is forced or reformed into a precisely dimensioned convex or outwardly curved annular flared lip or wall section N (FIG. 9) with the raw edge J forming a precisely located coextension of the convex wall section N. During this forming action the base of the conical wall section N adjacent the "break" line K is forced tightly against the cylindrical support L to provide for a precise dimensioning of the inside diameter of the convex wall section N to produce the flared lip or terminal edge portion C of the neck B.

Without the "break" line K and the slight reduction in thickness of the vertical wall section H to produce the sharpness of the "break" line, it has been found that the terminal raw edge J has a distinct tendency to curl upwardly and inwardly, thereby producing a most undesirable S shaped hook at the terminal end of the convex annular wall section M. The initial bending of the vertical wall section H at the "break" line K into the form of the conical wall section L keeps the terminal raw edge J coextensive with the adjoining wall section and thereby overcomes the tendency of this terminal wall edge to assume an S shape.

Following this precise formation of the convex wall section N, the endwise pressure is continued and brought to bear on the sloping wall section F and rounded corner G. This pressure action effects an endwise compression of the sloping wall section F which crowds the wall section inwardly and downwardly against the cylindrical support L, with the result that the sloping wall section F is reformed into a vertical cylindrical wall section O (FIG. 10) having a precise inside diameter substantially equal to the precise outside diameter of the support L. This compressing action also reforms the comparatively large curved wall section G into a sharp corner section P (FIG. 10) which connects the neck B to the can end A.

There thus results an upstanding neck B having a precise inside diameter, precise overall height, a sharp base corner section P, and a precisely shaped and dimensioned terminal edge portion or lip C for the reception of a nozzle or other auxiliary can part. This completes the formation of the neck B.

One form of apparatus for carrying out these method steps is shown in FIGS. 1, 3, 4 and 7 of the drawings. Such an apparatus preferably comprises a die mechanism having upper and lower punch and die instrumentalities which are axially located and relatively moveable toward and away from each other.

Figure 2:
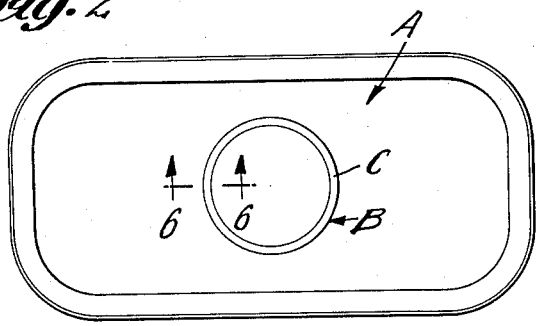
FIG. 2 is a plan view of a can part having a neck formed in accordance with the steps of the instant method invention.

The die mechanism shown in FIG. 1 comprises a stationary die ring 21 which is secured to a bed plate 22. The die ring 21 is surrounded by a yieldably mounted support pad 23 having a surrounding locating ring 24 held in place by a retaining ring 25 secured to the bed plate 22. Compression springs 26 interposed between the locating ring 24 and the bed plate 22 provide for the yieldability of the support pad 23.

The can end A to be provided with the neck B is supported on the support pad 23 and is held in proper position by the locating ring 24.

The upper or punch instrumentality preferably comprises a cylindrical punch 27 (FIG. 1) disposed in axial alignment with the die ring 21 for reciprocation into and out of the ring. This punch 27 is secured to a reciprocable head 28 for attachment to a conventional press slide. The punch 27 is surrounded by a spring loaded auxiliary pressure ring 31 which exerts a yieldable pressure against a surrounding pressure ring 32 held in place by a retainer ring 33, secured to the head 28 as shown in FIG. 1.

When the head 28 moves down toward the lower die instrumentalities through a working stroke, the pressure ring 32 engages against the positioned can end A to hold it in place, while the punch 27 cuts through and pierces the can end and enters into the stationary die ring 21 as shown in FIG. 3 to cut the aperture D in the can end. The cut out material of the can end falls through the bottom of the die ring 21 to any suitable place of deposit.

As the head 28 continues to descend, the pressure ring 32 engages against the bottom of the head 28 and thus through direct pressure from the head forces the can end A and the support pad 23 downwardly around the outside of the die ring 21 as shown in FIG. 4. This action bends up the marginal edge portion of the can end surrounding the aperture D and thus produces the preliminary neck portion E having the sloping wall section F, the large curved connecting wall section G, the vertical wall section H, the raw terminal edge J, and the "break" line K as shown in FIG. 5.

The sloping wall section F and the comparatively large curved wall section G are produced by the lower inner edge portion 34 of the pressure ring 32, which edge portion 34 is shaped to produce this result. The inside diameter of the pressure ring 32 is also dimensioned in respect to the outside diameter of the die ring 21, to provide for a dragging action on the vertical wall section H of the neck portion to produce the slight reduction in the thickness of this vertical wall section H as mentioned above and to produce the sharp "break" line K as shown in FIG. 5.

The final forming and precise dimensioning of the preliminary neck portion E preferably is effected in separate die mechanism (shown in FIG. 7) which differs in construction from the preliminary forming die mechanism of FIGS. 1, 3 and 5 and comprises a yieldable spring loaded post 35 disposed in a bed plate 36. The post 35 is surrounded by a yieldable spring loaded support pad 37 held in place by a retainer ring 38 secured to the bed plate 36. The support pad 37 is formed with an upwardly projecting locating ring 39 for locating a can end A on the support pad in a manner so that the preliminary neck portion E is disposed in axial alignment with the post 35.

The upper instrumentalities of this die mechanism preferably comprise a cylindrical forming or support member 42 disposed in axial alignment with the yieldable post 35 for reciprocation relative thereto. This support member 42 is secured to a reciprocable head 43 for attachment to a conventional press slide. The support member 42 is surrounded by a yieldable spring loaded pressure ring 44 held in place by a retainer ring 45 carried on the head 43 as shown in FIG. 7.

The lower end 46 of the support member 42 is of a precise diameter equal to the desired precise inside diameter of the neck B and serves as the precise dimensioning element for the inside diameter of the neck when the preliminary neck portion E is reformed as explained above. Adjacent this precise diameter portion 46 of the support member 42, the member is formed with an enlarged step portion, the lower face of which is provided with an annular groove 47.

The inner diameter of this groove 47 is coextensive with the precise outside diameter of the portion 46 of the support member 42. The outer diameter of the groove is of a precise dimension and serves as a stop shoulder 48 for confining the terminal raw edge J of the neck B as explained above. The ceiling of the groove 47 is precisely curved from the stop shoulder 48 into the precise outside diameter of portion 46 of the support member 42, to produce to precise dimensions the convex wall section N shown in FIG. 9.

When the upper die instrumentalities move down through a working stroke, the cylindrical support member 42 enters the mouth of the preliminary neck portion E of the can end A resting on the support pad 37 of the lower die instrumentalities, and the pressure ring 44 engages against and holds the can end in place on the support pad.

With continued downward movement of the upper die instrumentalities, the ceiling of the annular curved groove 47 engages and exerts an edgewise or endwise pressure on the terminal raw edge J of the preliminary neck portion vertical wall section N (FIG. 5) and forces the wall section H to bend outwardly at the "break" line K. It has been found that due to the "break" line K, the wall section H remains substantially straight and flares outwardly into the form of a conical wall, herein indicated by the character M (FIG. 8). When the raw edge J engages against the stop shoulder 48 as shown in FIG. 8 its outward movement is arrested and it is thereby confined against further movement.

This confining of the terminal raw edge J of the neck portion E continues the edgewise or endwise pressure on the walls of the neck portion and thereby forces the conical wall section M, upwardly in conforming engagement with the ceiling of the groove 47 and inwardly against the cylindrical support member 42 as shown in FIG. 9, and thereby produces the precisely dimensioned curved lip or wall section N (FIG. 9).

As the pressure on the neck wall continues, the sloping wall section F and the comparatively large curved wall section G (FIG. 5) are crowded or forced downwardly and inwardly against the support pad 37 and against the cylindrical support member 42 as shown in FIG. 10 to produce the percise inside diameter neck wall O and the sharp corner P connecting the neck to the can end as shown in FIG. 10.

This completes the neck forming operations and there thus results the precisely dimensioned and shaped neck B as shown in FIG. 6 for use with an auxiliary can part as mentioned above.

It is thought that the invention and many of its attendant advantages will be understood from the foregoing description, and it will be apparent that various changes may be made in the steps of the method described and their order of accomplishment without departing from the spirit and scope of the invention or sacrificing all of its material advantages, the method hereinbefore described being merely a preferred embodiment thereof.

I claim:

1. A method of forming a neck on a can part, comprising the steps of producing in said can part an annular wall defining a partially formed neck portion and having a lower inwardly sloping section and an upper generally upright section terminating in a free edge providing a cylindrical support of a precise diameter within said neck portion and applying outward and endwise pressures on said free edge of the annular wall to flare said upright section outwardly and to crowd said sloping wall section inwardly into conforming engagement with said support to produce an upright neck having an outwardly flared upper portion and a vertical annular wall portion with a precise inside diameter corresponding to the outside diameter of said support.

2. A method of the character defined in claim 1 wherein there is added the step of continuing said endwise pressure to axially compress said vertical annular wall portion to produce a sharp base corner along the line of connection with said can part.

3. A method of forming a neck on a can part, comprising the steps of producing in said can part a preliminary cylindrical neck including a generally upstanding annular wall terminating in a raw edge, providing a cylindrical support of a precise diameter within said preliminary neck, flaring said annular wall outwardly to produce a conical shaped wall section including said terminal raw edge, and reforming said conical shaped wall section into an arcuate shaped wall section disposed normal to said terminal raw edge and simultaneously crowding said arcuate shaped wall section against said cylindrical support to produce a precisely formed curved lip having a precise internal diameter for said neck.

4. A method of forming a neck on a can part, comprising the steps of producing in said can part a generally upstanding annular wall terminating in a raw edge, laterally bending and compressing and simultaneously elongating a portion of said annular wall including said raw edge to produce an annular break line in said annular wall, providing a cylindrical support of a precise diameter within said annular wall adjacent said break line, flaring said annular wall outwardly at said break line to produce a conical shaped wall section including said terminal raw edge, and reforming said conical shaped wall section into an arcuate shaped wall section disposed normal to said terminal raw edge and simultaneously crowding said arcuate shaped wall section against said cylindrical support to produce a precisely formed curved lip having a precise internal diameter for said neck.

5. A method of forming a neck on a can part, comprising the steps of producing in said can part a preliminary cylindrical neck comprising an upstanding annular wall having an inwardly sloping annular wall section terminating at an annular break line and merging at said break line into a vertical annular wall section terminating in a raw edge, and providing a cylindrical support of a precise diameter within said preliminary neck, flaring said vertical wall section outwardly at said break line to produce a conical shaped wall section including said raw terminal edge, and confining said raw terminal edge while applying an endwise pressure on said sloping annular wall section to reform said flared conical shaped wall section into an arcuate shaped wall section disposed normal to said terminal raw edge and having a precise internal diameter corresponding to the outside diameter of said cylindrical support.

References Cited in the file of this patent
UNITED STATES PATENTS

| 2,384,810 | Calleson et al. | Sept. 18, 1945 |
| 2,555,700 | O'Neil | June 5, 1951 |
| 2,944,502 | Lemmerz | July 12, 1960 |